Sept. 5, 1939.     H. O. HEDGES     2,171,554
ROD CONNECTION AND CROSS HEAD GUIDE
Filed Jan. 11, 1937     2 Sheets-Sheet 1
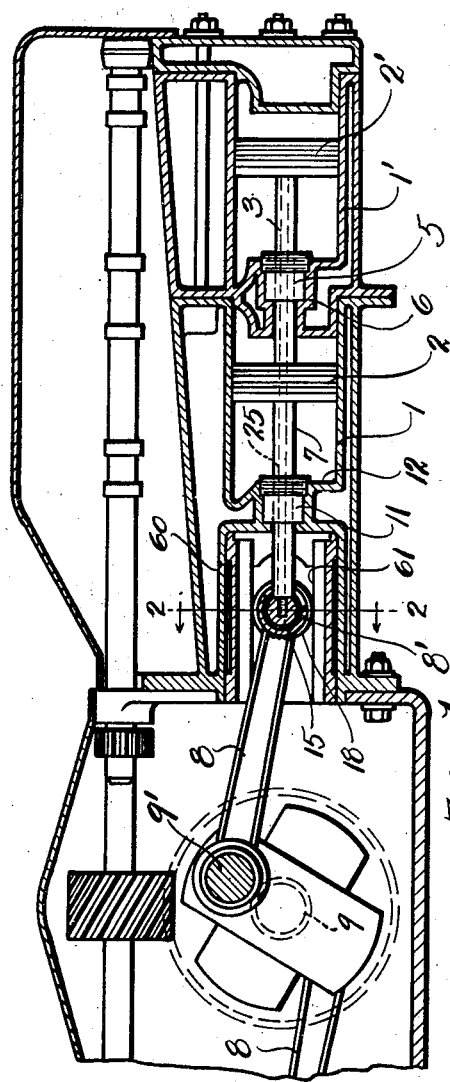
INVENTOR.
HARRY O. HEDGES
BY
Cook & Robinson
ATTORNEYS.

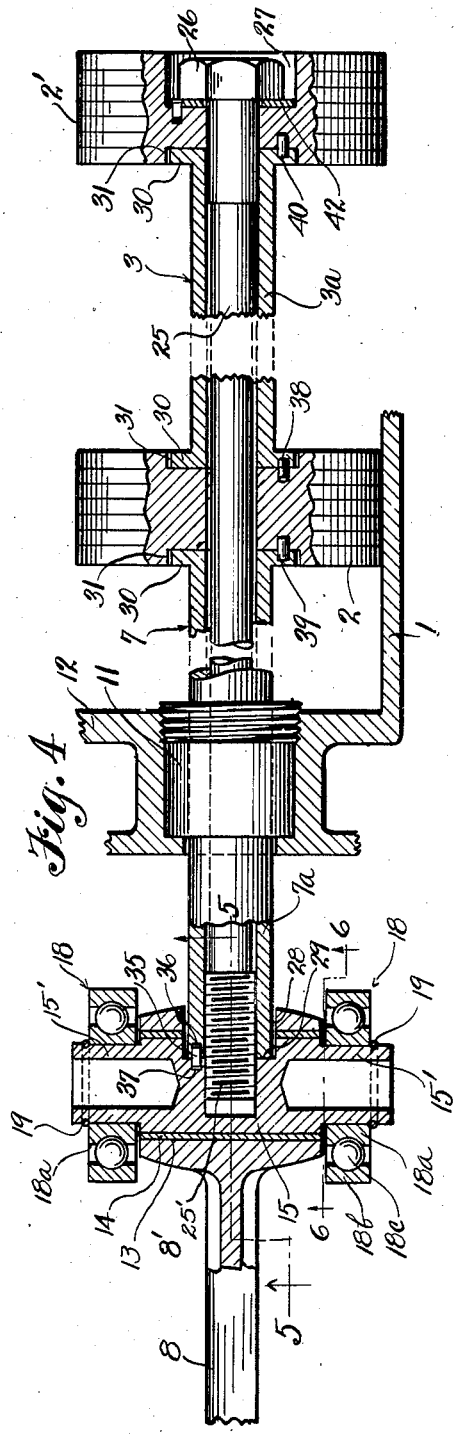

Patented Sept. 5, 1939

2,171,554

UNITED STATES PATENT OFFICE 2,171,554

ROD CONNECTION AND CROSS HEAD GUIDE

Harry O. Hedges, Seattle, Wash., assignor to Hedges Motor Company, Seattle, Wash., a corporation of Washington Application January 11, 1937, Serial No. 120,050

3 Claims. (Cl. 308—3)

This invention relates to improvements in engines, and it has reference more particularly to engines of those reciprocating piston types wherein the piston has a rod fixed thereto and connected to the throw of a crank shaft through the mediacy of an oscillating connecting rod; it being the principal object of this invention to provide means for connecting the piston rod and connecting rod in a more economical and more practical manner with reference to assembly or disassembly of the parts. Also, to effect this connection by means of a wrist pin which is designed to serve additionally as a cross head member for guiding the travel of the connected parts, and for resisting those lateral forces that result from the application of power from the piston rod to the connecting rod.

More specifically stated, it is the principal object of the present invention to provide an improved cross head guide and rod connection especially adapted to engines of the kind disclosed in my U. S. Patent to be issued on December 22, 1936, under No. 2,064,913.

Other objects of the invention reside in the details of construction, in the combination of parts, and in their mode of assembly, as will hereinafter be more fully described.

In accomplishing the above stated and other objects of the invention, I have provided the improved details of construction, the preferred forms of which are illustrated in the accompanying drawings, wherein—

Fig. 1 is an axial, sectional view illustrating a piston rod and connecting rod assembly and connecting means embodying the present invention as applied to a tandem cylinder engine.

Fig. 2 is a cross section on line 2—2 in Fig. 1.

Fig. 3 is a detail illustrating the invention as applied to a single cylinder engine.

Fig. 4 is an enlarged detail, partly in section, of the piston rod and connecting rod assembly, particularly illustrating the wrist pin connection and cross head guide rollers.

Fig. 5 is a sectional detail on the line 5—5 in Fig. 4.

Fig. 6 is a sectional detail on the line 6—6 in Fig. 4.

Referring more in detail to the drawings—

1 and 1' designate coaxially alined power cylinders of an internal combustion engine in which the present invention is embodied. Numerals 2 and 2', respectively, designate pistons that are fitted for reciprocation in the cylinders 1 and 1'.

A piston rod, designated in its entirety by reference numeral 3, connects the pistons 2 and 2' rigidly in tandem for movement in unison, and this rod operates slidably through a packed gland 5 in the cylinder and wall 6. Also, there is a piston rod designated in its entirety in Fig. 1 by reference numeral 7, that operatively connects the piston 2, through cross head means presently described, with a connecting rod 8, whereby operative connection is made in the usual manner with the throw 9' of a rotatably mounted crank shaft 9. The rod 7 in this instance operates slidably through a packing gland 11 in an end wall 12 of the cylinder 1.

One of the principal features of the present invention resides in the specific means for effecting the connection between the piston rod 7 and the connecting rod 8, and this means is best illustrated in Figs. 2, 4 and 5, wherein the connecting rod 8 is shown as being equipped at the end opposite that attached to the crank shaft, with an enlarged end bearing 8', having a cross bore 13 therein within which a sleeve bushing 14 is fitted and within which bushing a wrist pin 15 is contained.

The opposite end portions of the wrist pin 15 extend equally beyond the bearing and the opposite ends of the bushing 14, and these parts are reduced somewhat in diameter for mounting thereon ball bearing assemblies, designated in their entireties by numerals 18.

The ball bearing assemblies above mentioned have inner raceways 18a fitted on the reduced end portions 15' of the pin 15, and these raceways are locked in place and against the shouldered portions of the pin resulting from the reduction in diameter, by means of keys 19. The outer raceways 18b of the ball bearing assemblies turn freely upon the balls 18c and are designed to serve as cross head guide rollers, as will presently be understood.

The piston rods 3 and 7 are, in effect, one rod on which the two pistons are rigidly fixed. The rod 3, as shown in detail in Fig. 4, comprises a tubular sleeve 3a that is utilized as a spacer between the pistons 2 and 2'. Likewise, the piston rod 7 comprises a tubular sleeve 7a which is utilized in this assembly as a spacer between the piston 2 and the wrist pin 15. These two spacing sleeves, 3a and 7a, are in coaxial alinement and also coaxial of the cylinders and their pistons, and there is an elongated, connecting bolt 25 extended through the pistons and tubular spacing sleeves, and this bolt, at its outer end, is provided with a head 26 seated within a socket 27 in the outer face of piston 2', and, at its inner end, has a threaded portion 25' threaded into the wrist pin, thus to connect and tighten the parts together on the bolt, and to provide a rigid unitary assembly.

By reference to Fig. 5, it will be observed that the end bearing portion 8' of the connecting rod 8 is formed with an arcuate recess or slot 28 across the outer side and in line with the axis of the rod, and of sufficient size for receiving the end of the piston rod 7 therethrough. It will also be noted that the wrist pin 15, in an area registering with this slot, is formed with a flat bottomed socket 29, see Fig. 4, within which the end of the spacing sleeve 7a is firmly seated. Also, it will be observed that those ends of the tubular sleeves 3a and 7a, which are seated against the faces of pistons 2 and 2', have extended flanges, as at 30, and that these flanged portions seat within sockets 31 provided therefor in the faces of the pistons, thus to give additional and adequate bearing surface and effect a more rigid assembly of parts.

The assembled parts are locked against any possible turning that would permit a looseness of connection, by means of a short pin 35 that has opposite end portions fitted in registering sockets 36 and 37 in the end of the sleeve 7a and the seat of the socket 29. Also, pins 38 and 39 likewise lock the flanged ends of sleeves 3a and 7a to the piston 2 and a pin 40 locks the outer end flange 30 of sleeve 3a to the piston 2', and a locking washer 42 is interposed between the head 26 of the bolt 25 and the base of the piston socket 27 in which the bolt head 26 is located. In view of the fact that the pistons are thus locked against turning relative to the sleeves, and in view also of the fact that the sleeve 7a is locked against turning in the wrist pin socket, and since the head of the bolt is locked in its piston socket, it is apparent that there can be no possibility of the bolt turning and permitting any looseness to result in the assembly of parts.

As shown in Fig. 6, a set screw 45 is threaded onto the wrist pin. This screw extends into an arcuate slot or recess 46 in the bearing 8' and its purpose is to keep the pin from turning in the bearing prior to assembly of parts, to a position that would make it difficult to locate the threaded socket into which the end of bolt 25 is to be threaded.

It is to be understood that in the case of a one cylinder engine, as shown in Fig. 3, the assembly would be the same as before described insofar as the connection with the cross head guide or wrist pin 15 is concerned. The difference would be that the cylinder 1', piston 2' and rod 3 would be eliminated, and the connecting bolt 25 would be shortened accordingly.

Fixed to the end of cylinder 1, and here shown to be in coaxial alinement therewith, is a cylindrical, cross head guide housing 60 in which parallel guideways 61 and 61' are formed and within which guideways the rollers 18—18, respectively, are adapted to travel, as shown in Fig. 2. These guideways are parallel with and at opposite sides of the piston rod 7, and provide for the reciprocal travel of the rollers therein in the same manner and for the same purpose as has been described and illustrated in the United States patent previously mentioned. Therefore, since this arrangement of rollers forms no particular part of the present application, they will not be further discussed, except to state that the wrist pin and roller assembly coacting with the guideways holds the poston rod 7 in coaxial alinement with its cylinder and piston while reciprocating and effectively resists all lateral forces that are caused by reason of the application of power through rod 7 to the oscillating connecting rod 8 which otherwise would tend to throw the piston out of alinement and cause detrimental and destructive wear on the rod and its packing gland.

With the present arrangement, should it be desired to disassemble the parts described, it is only necessary that the bolt 25 be unthreaded from pin 15 and withdrawn. This disconnects the piston assembly from the connecting rod 8 and thus permits the cylinders and their pistons to be removed and disassembled. The assembly of parts, likewise, is facilitated by reason of the fact that all parts may be brought into assembled relation in their cylinders prior to the connection of the piston rod 7 with the wrist pin 15, and this is by reason of the fact that after the parts have been brought into assembled relation, the bolt 25 may be applied and tightened, thereby to unite all of the parts in their operating relationship.

The present assembly provides not only for quick and easy assembly or disassembly of parts, but also is an economical construction from the manufacturing standpoint, is durable, substantial and satisfactory in every respect.

Having thus described my invention, what I claim as new therein and desire to secure by Letters Patent is—

1. In an engine, a cylinder having a piston reciprocally mounted therein and a piston rod fixed to the piston and extending from the cylinder, a pair of cross head guides parallel with and at opposite sides of the piston rod, a crank shaft, a connecting rod mounted on the crank shaft and having an end bearing, a wrist pin fitted in the bearing and having its opposite end portions extended therefrom, guide bearings on the pin ends contained in said guideways; said bearing having an opening exposing said pin, and said piston rod being extended through said opening and solidly connected with the pin.

2. In an engine, a cylinder having a piston reciprocally contained therein, a crank shaft, a connecting rod operatively mounted on the crank shaft and having an end bearing, a wrist pin fitted in the bearing and a piston rod comprising a spacing sleeve, with its opposite ends fitted to the piston and wrist pin, and a connecting bolt extended through the piston and sleeve and threaded into said wrist pin and clamping the parts functionally together and pins interlocking the ends of the sleeve with the parts against which it engages to prevent relative turning.

3. In an engine, a cylinder having a piston reciprocally mounted therein and a piston rod fixed to the piston and extending from the cylinder, a pair of cross head guides parallel with and at opposite sides of the piston rod, a crank shaft, a connecting rod mounted on the crank shaft and having an end bearing, a wrist pin fitted in the bearing and having its opposite end portions extended therefrom, guide bearings in the pin ends contained in said guideways; said bearing having an opening exposing said pin, and said piston rod comprising a tubular sleeve with one end extended through said opening and seated against the wrist pin and its opposite end seated against the end of the piston as a spacer, a bolt extended through the piston and sleeve and threaded into the wrist pin, and means locking the sleeve and bolt against turning.

HARRY O. HEDGES.